Patented Feb. 26, 1946

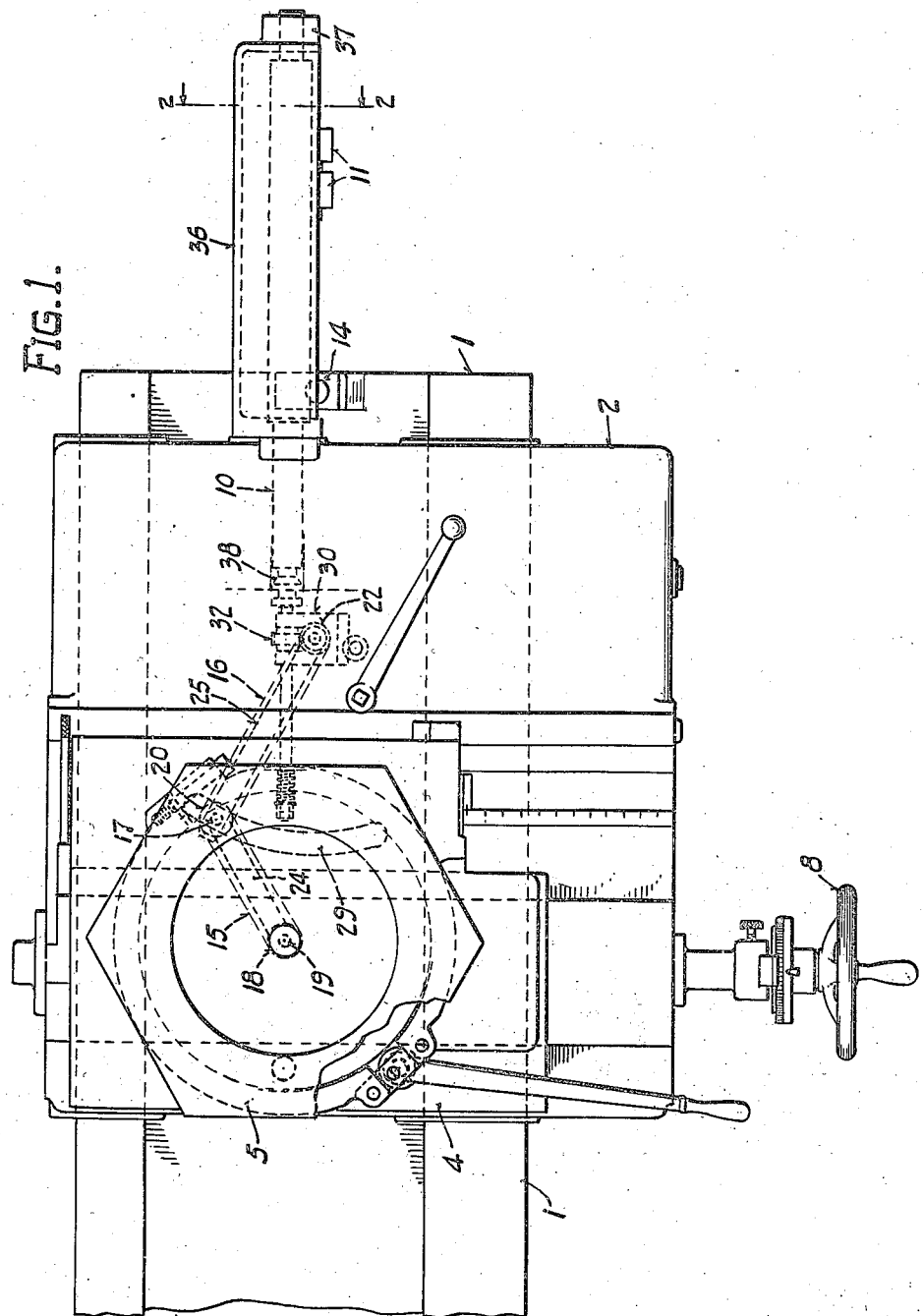

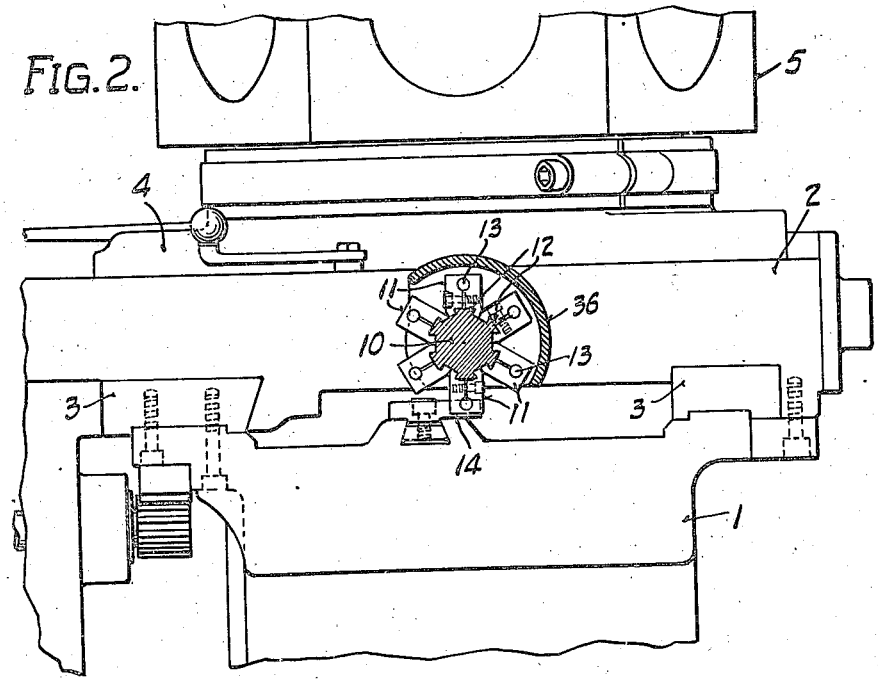
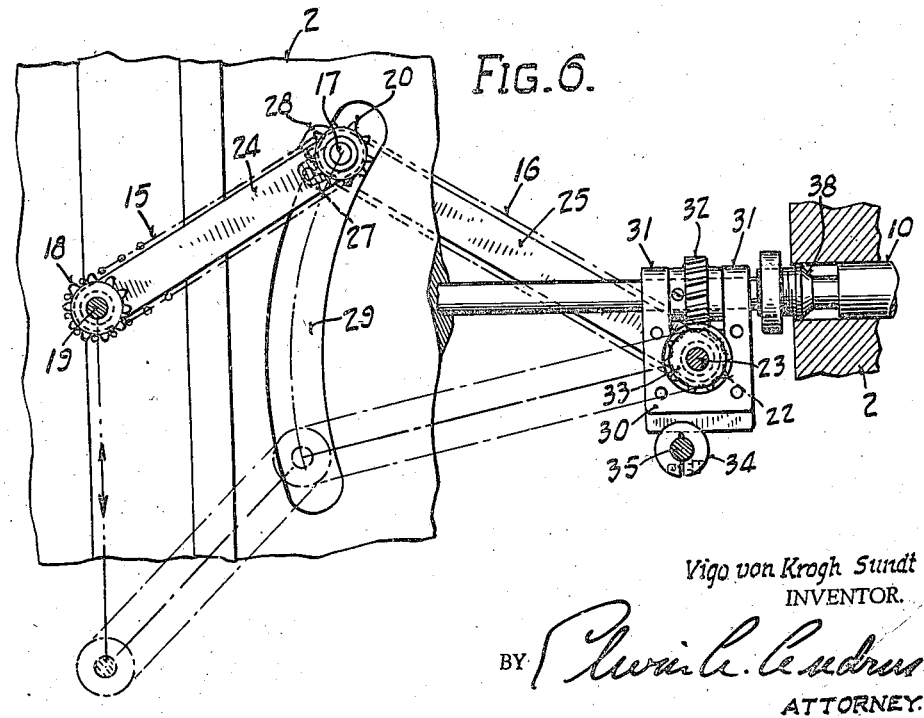

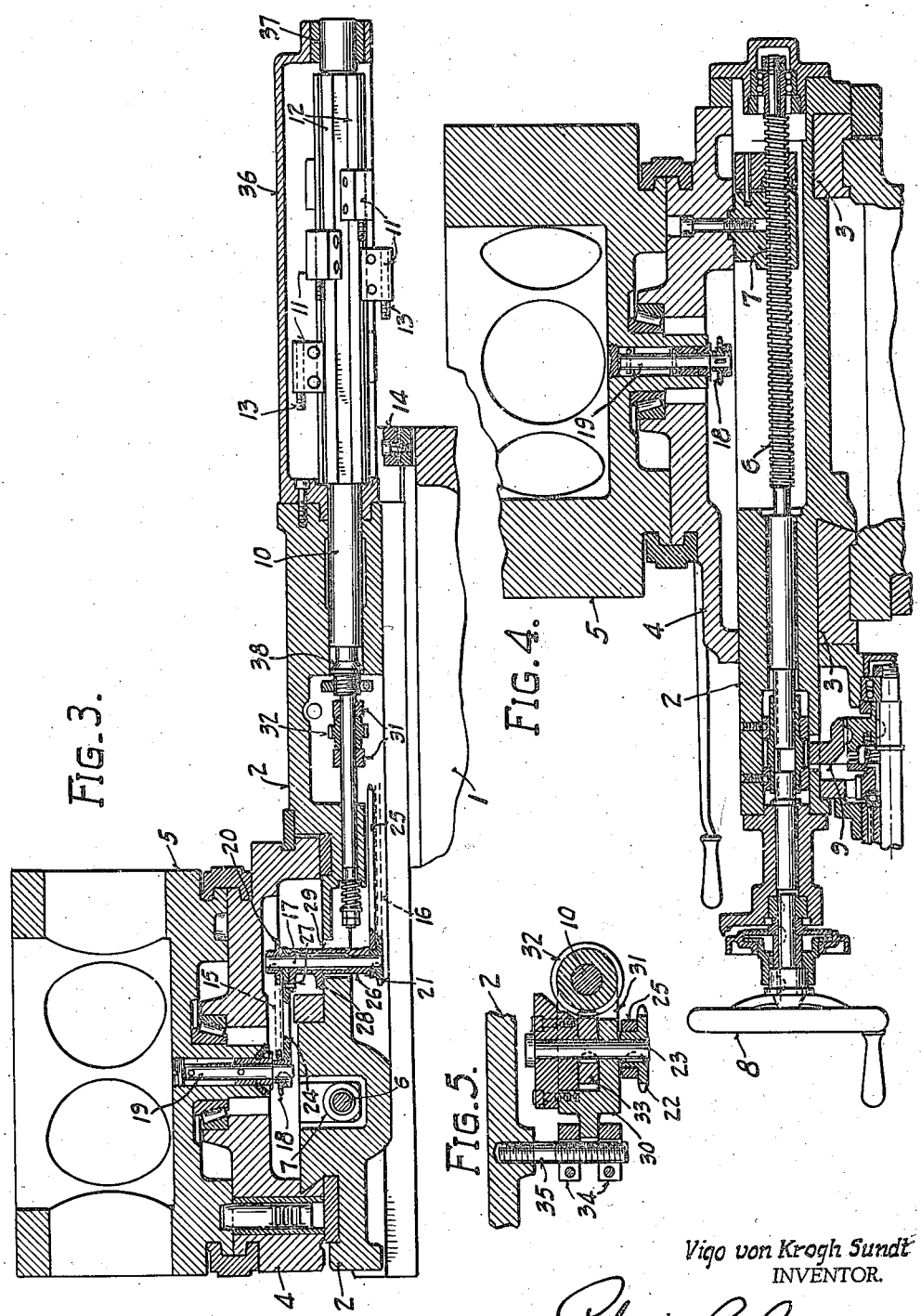

2,395,696

UNITED STATES PATENT OFFICE 2,395,696

STOP ROD INDEX FOR LATHES

Vigo von Krogh Sundt, Madison, Wis., assignor to Gisholt Machine Company, Madison, Wis., a corporation of Wisconsin Application December 7, 1942, Serial No. 468,141

6 Claims. (Cl. 29—65)

This invention relates to a stop rod index for lathes employing a turret requiring a separate stop for the feed for each operative rotational position of the turret.

One of the objects of the invention is to provide a support for the stop rod against bending forces resulting when the index stop on the rod engages the frame of the lathe.

Another object of the invention is to provide an accurate drive connection between a cross feed turret and the stop rod to effect turning of the latter with the turret.

Another object is to provide for the accurate indexing of the stop rod regardless of the transverse position of the turret.

The invention is illustrated in the accompanying drawings in which:

Figure 1 is a top plan view of a cross feed turret and the rear end of the lathe;

Fig. 2 is an end elevation of the lathe with the stop rod support sectioned on line 2—2 of Fig. 1;

Fig. 3 is a central vertical longitudinal section through the turret and stop feed mechanism;

Fig. 4 is a vertical transverse section through the turret showing the cross feed therefor;

Fig. 5 is a detail showing the gears for indexing the stop rod; and

Fig. 6 is a horizontal sectional detail showing the connecting drive between the turret and the stop rod.

The lathe bed 1 supports the longitudinally movable turret carriage 2 by means of the laterally spaced ways 3. The carriage 2 supports a transversely movable turret member 4 upon which the turret 5 is rotatably mounted on a vertical axis.

The carriage 2 is moved longitudinally of the lathe bed 1 by means of an apron and suitable apron feed mechanism, not shown. The member 4 is moved transversely of the carriage by means of the screw 6 mounted in the carriage and the traveling nut 7 threaded on the screw and depending from the member 4. A hand wheel 8 and an alternative power drive 9 are provided to turn the screw 6 and give the desired cross feed for the turret 5.

The longitudinal feed of the carriage 2 is terminated at a predetermined position by the stop rod 10 which extends rearwardly from the end of the carriage. The stop rod 10 has a plurality of stops 11 splined thereto and separately adjustable along longitudinal ribs 12 spaced around the circumference of the rod. There are the same number of stops 11 and ribs 12 as there are sides or working positions for the turret 5. In the present instance the turret has six sides and there is a stop 11 for each side.

The stops 11 are fixed at separate adjusted positions along the rod 10 to provide for the stopping of the longitudinal feed of the turret at different locations corresponding to the requirement of the work being done.

Each stop has an adjustment screw 13 which constitutes the fine adjustment therefor and which engages a projection 14 on the bed 1 when the particular stop is in indexing position. For this purpose, the stop 11 on the underside of the rod 10 should correspond with the forward side of the turret 5.

When the turret is turned to bring forward another side, the stop 11 for that side should be at the bottom of rod 10. Thus the rod 10 should always rotate with the turret 5 in order to properly index the respective stops.

The driving connection between the turret 5 and the stop rod 10 comprises a pair of articulated chain drives 15 and 16 having a floating swivel stud 17 to compensate for changes in distance between the center of the turret and the gear drive on the stop rod 10 caused by the cross feed of the turret.

The chain 15 is driven by a sprocket 18 secured to the lower end of the sprocket stud 19 depending from the center of the turret 5. The chain 15 drives a sprocket 20 secured to the upper end of the floating swivel stud 17.

The chain 16 is driven by sprocket 21 secured to the lower end of stud 17, and drives a sprocket 22 secured to the lower end of a spiral gear shaft 23, adjacent the stop rod 10.

The chains are held tight on the sprockets by the spacer plate 24, extending between sprockets 18 and 20 and providing bearings for the respective sprocket hubs, and by the spacer plate 25 extending between sprockets 21 and 22 and providing bearings for the respective sprocket hubs.

The floating swivel stud 17 is supported by a sleeve 26 having an upper flange lug 27 supporting plate 24 and having a central flange lug 28 resting on a part of carriage 2. The stud 17 extends vertically through a slot 29 in carriage 2, the slot having the shape of an arc of a circle with the shaft 23 as a center and providing for the free movement of the stud 17 as the joint between the two chains 15 and 16 articulates by reason of the cross feed of turret 5.

The spiral gear shaft 23 is journaled in a gear housing 30 which has side extensions 31 in which a cylindrical part of the stop rod rotates. A spiral gear 32 is secured to the rod 10 between the extensions 31 and meshes with the spiral gear 33 keyed to shaft 23 in housing 30.

The housing 30 is held against turning with the spiral gear 32 by means of a pair of collars 34 secured to a stud 35 threaded into the carriage 2.

The slot 29 in carriage 2 is of sufficient width to allow lateral movement of swivel stud 17 when the stop rod 10 prevents movement of shaft 23 with the carriage in effecting stopping of the carriage feed.

The detail construction and operation of the stop rod in controlling the carriage feed is not shown, since any suitable mechanism may be employed for this purpose.

The stop rod is supported against warpage by an outboard bearing comprising a channel housing 36 secured to the end of the carriage 2 and having a bearing 37 at its outer end for receiving the stop rod 10. The stop rod is journaled in bearing 37 in a manner allowing sufficient longitudinal movement of the rod in the bearing to provide for the requisite operation of the stop mechanism by the bevel cam 38 on the stop rod.

The channel housing 36 and bearing 37 prevent any give or bend in the stop rod and provide the necessary rigidity to obtain duplication of accurate tripping of the carriage 2.

The invention may have various embodiments within the scope of the accompanying claims.

I claim:

1. In a lathe or the like, a bed, a carriage movable longitudinally of the bed, a cross feed slide mounted on said carriage, a turret rotatably mounted on said cross feed slide, a stop rod mechanism mounted on said carriage and extending longitudinally thereof, a plurality of independently adjustable stops disposed at different circumferential positions on said stop rod mechanism, stop mechanism on said bed for stopping the feed of the carriage, said stop rod mechanism being rotatable to index any given stop thereon with the stop mechanism on the bed, a drive connection between the turret and the stop rod mechanism to rotate the latter with the former, and a freely floating swivel joint in said connection providing for changes in distance between the turret and stop rod mechanism arising by reason of the cross feed of the turret.

2. In a lathe or the like, a bed, a carriage movable longitudinally of the bed, a cross feed slide mounted on said carriage, a turret rotatably mounted on said cross feed slide, a stop rod mechanism mounted on said carriage and extending longitudinally thereof, a plurality of independently adjustable stops disposed at different circumferential positions on said stop rod mechanism, stop mechanism on said bed for stopping the feed of the carriage, said stop rod mechanism being rotatable to index any given stop thereon with the stop mechanism on the bed, and an expansible positive drive connection between said turret and stop rod mechanism to rotate the latter with the former, said drive connection readily lengthening and shortening to compensate for the changing distance between the turret and stop rod mechanism arising from the cross feed of the turret without reducing the accuracy of the indexing of the stop rod.

3. In a lathe or the like having a longitudinally movable carriage with a cross feed turret slide mounted thereon, a stop rod indexing mechanism for the carriage, comprising a rotatable stop rod extending longitudinally of the carriage, a rotatable turret mounted on the cross feed slide on said carriage and having a sprocket rotatable therewith, a floating swivel stud with a pair of sprockets secured thereon, a gear drive for said stop rod having a sprocket for driving the same, a chain connecting the sprocket on said turret with one of the sprockets on said stud, and a second chain connecting the other sprocket on said stud with the sprocket for driving said gear drive.

4. In a lathe or the like having a longitudinally movable carriage with a cross feed turret slide mounted thereon, a stop rod indexing mechanism for the carriage, comprising a rotatable stop rod extending longitudinally of the carriage, a rotatable turret mounted on the cross feed slide on said carriage and having a sprocket rotatable therewith, a floating swivel stud with a pair of sprockets secured thereon, a gear drive for said stop rod having a sprocket for driving the same, a chain connecting the sprocket on said turret with one of the sprockets on said stud, a second chain connecting the other sprocket on said stud with the sprocket for driving said gear drive, and spacer plates extending between the respective driving and driven sprockets to hold the chains tight on the sprockets.

5. In a lathe or the like having a longitudinally movable carriage with a cross feed turret slide mounted thereon, a stop rod indexing mechanism for the carriage, comprising a rotatable stop rod extending longitudinally of the carriage, a rotatable turret mounted on the cross feed slide on said carriage and having a sprocket rotatable therewith, a floating swivel stud with a pair of sprockets secured thereon, said stud being disposed with its axis vertical in an opening in the top of the carriage and with one sprocket disposed above said opening and in belt alignment with said turret sprocket and with the other stud sprocket disposed below said opening, a gear drive for said stop rod having a sprocket for driving the same, a chain connecting the sprocket on said turret with one of the sprockets on said stud, and a second chain connecting the other sprocket on said stud with the sprocket for driving said gear drive.

6. In a lathe or the like having a longitudinally movable carriage with a cross feed turret slide mounted thereon, a stop rod indexing mechanism for the carriage, comprising a rotatable stop rod extending longitudinally of the carriage, a rotatable turret mounted on the cross feed slide on said carriage and having a sprocket rotatable therewith, a floating swivel stud with a pair of sprockets secured thereon, said stud being disposed with its axis vertical in an opening in the top of the carriage and with one sprocket disposed above said opening and in belt alignment with said turret sprocket and with the other stud sprocket disposed below said opening, means for supporting said stud on said carriage top while allowing freedom of lateral movement of the stud, a gear drive for said stop rod having a sprocket for driving the same, a chain connecting the sprocket on said turret with one of the sprockets on said stud, and a second chain connecting the other sprocket on said stud with the sprocket for driving said gear drive.

VIGO VON KROGH SUNDT.